(12) United States Patent
Hallein et al.

(10) Patent No.: US 12,471,695 B2
(45) Date of Patent: Nov. 18, 2025

(54) HANDLE FOR A PERSONAL-CARE IMPLEMENT AND PERSONAL-CARE IMPLEMENT

(71) Applicant: The Gillette Company LLC, Boston, MA (US)

(72) Inventors: Christine Hallein, Frankfurt am Main (DE); Angelika Beruda, Schwalbach (DE); Jens Störkel, Frankfurt am Main (DE); Dominik Langhammer, Frankfurt am Main (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/363,135

(22) Filed: Jun. 30, 2021

(65) Prior Publication Data
US 2022/0000254 A1    Jan. 6, 2022

(30) Foreign Application Priority Data

Jul. 2, 2020 (EP) .................................. 20183633

(51) Int. Cl.
*A46B 5/02* (2006.01)
*A46B 5/00* (2006.01)
*A46B 9/04* (2006.01)

(52) U.S. Cl.
CPC ............ *A46B 5/021* (2013.01); *A46B 5/0095* (2013.01); *A46B 5/026* (2013.01); *A46B 9/04* (2013.01); *A46B 2200/1066* (2013.01)

(58) Field of Classification Search
None
See application file for complete search history.

(56) References Cited

U.S. PATENT DOCUMENTS

| | | | | |
|---|---|---|---|---|
| 1,984,787 A | * | 12/1934 | Elliot | A46B 5/02 D7/395 |
| D238,281 S | * | 12/1975 | Cali | D24/139 |
| D258,241 S | * | 2/1981 | Takada | D4/135 |
| 8,448,284 B2 | | 5/2013 | Gross et al. | |
| 9,301,823 B2 | | 4/2016 | Jimenez | |

(Continued)

FOREIGN PATENT DOCUMENTS

| | | | |
|---|---|---|---|
| CN | 102902048 A | | 1/2013 |
| CN | 306155663 A | * | 3/2022 |

(Continued)

OTHER PUBLICATIONS

CM05225FQ Extended European Search Report and Search Opinion; Application No. 20183633.5 ; dated Dec. 21, 2020; 7 pages.

(Continued)

*Primary Examiner* — Laura C Guidotti
*Assistant Examiner* — Dana Lee Poon
(74) *Attorney, Agent, or Firm* — Jay A. Krebs

(57) ABSTRACT

A handle for a personal-care implement has a longitudinal extension extending between a distal end and a proximal end opposite to the distal end. The handle has an outer lateral surface with a three-dimensional surface structure, wherein the surface structure comprises at least two continuous wave bands with alternating convex and concave curvatures forming wave crests and wave troughs, respectively, the wave bands extending along the longitudinal extension of the handle.

19 Claims, 3 Drawing Sheets

(56) References Cited

U.S. PATENT DOCUMENTS

| | | | |
|---|---|---|---|
| 9,521,899 B1 * | 12/2016 | Tai | A46B 5/02 |
| 9,546,678 B2 * | 1/2017 | Wu | F16C 3/02 |
| D869,855 S * | 12/2019 | Khayat | D4/101 |
| D895,981 S * | 9/2020 | Rennette | D4/138 |
| D915,776 S * | 4/2021 | Wang | D4/138 |
| 10,966,516 B2 * | 4/2021 | Hohlbein | A46B 9/04 |
| 2008/0256730 A1 | 10/2008 | Chen | |
| 2015/0020325 A1 * | 1/2015 | Yoshida | A61C 17/222 15/22.1 |
| 2019/0022485 A1 | 1/2019 | Geremia | |
| 2019/0117356 A1 | 4/2019 | Bärtschi et al. | |

FOREIGN PATENT DOCUMENTS

| | | | | |
|---|---|---|---|---|
| EP | 3090650 A1 * | 11/2016 | | A45D 29/05 |
| EP | 3542667 A1 * | 9/2019 | | |
| JP | 3809463 B1 | 8/2006 | | |
| JP | 3774728 B1 | 6/2007 | | |
| JP | 2007236768 A | 9/2007 | | |
| WO | 9917915 A1 | 4/1999 | | |

OTHER PUBLICATIONS

CM05225Q PCT Search Report and Written Opinion for PCT/US2021/040219 dated Aug. 25, 2021, 13 pages.

* cited by examiner

HANDLE FOR A PERSONAL-CARE IMPLEMENT AND PERSONAL-CARE IMPLEMENT

FIELD OF THE INVENTION

The present disclosure is concerned with a handle for a personal-care implement, the handle having an outer lateral surface with a three-dimensional surface structure. The present disclosure is further concerned with a personal-care implement comprising such handle.

BACKGROUND OF THE INVENTION

Personal-care implements, like toothbrushes, are well known in the art. Generally, tufts of bristles for cleaning teeth are attached to a bristle carrier or mounting surface of a brush head intended for insertion into a user's oral cavity. A handle is usually attached to the head, which handle is held by the user during brushing.

In order to use a personal-care implement effectively, appropriate maneuverability of the implement is crucial. Generally, the shape, dimensions and bending stiffness of the handle have a significant impact on the maneuverability and user comfort. Usually handles of personal-care implements, like toothbrushes, have the shape of a linear rod to be handled and manipulated by a user as needed. However, in the past it has been seen that such handles are neither comfortable to handle nor easy to maneuver in the oral cavity of the user.

For example, in order to achieve and preserve good oral health, and to prevent gingivitis, it is important to clean teeth and gums thoroughly, in particular in hard to reach areas, e. g. in the region of the back molars. Further, gaps between teeth and periodontium, the so-called gingival groove has to be thoroughly cleaned which requires a good and well-coordinated brushing technique. It is known that a lack of good removal of plaque in the gingival groove can cause gingivitis, i.e. inflammation of the gum tissue. Further, it is known that users/consumers use different brushing techniques, and, therefore, it is critical to identify optimal ergonomics of a toothbrush handle in order to provide good sensory feeling during brushing when using all types of brushing techniques.

Also, it has been seen in the past that toothbrushes can easily slip through the hand if wet during use, which results in less consumer comfort and poor handling performance.

Further, the center of gravity of common toothbrushes is relatively close to the toothbrush head, in particular when the head is loaded with toothpaste. If the center of gravity is relatively close to the toothbrush head, the toothbrush gets head loaded and can easily tip over once toothpaste is applied onto the brush head. Toothpaste may soil the surface onto which the brush has been placed. To prevent the loaded toothbrush from tipping over, additional geometrical structures, like roll stops/support structures are necessary. Toothbrushes are known having such structures in the form of edges attached to the head. However, such additional edges are uncomfortable in the mouth during brushing and less appealing.

It is an object of the present disclosure to provide a handle for a personal-care implement, e.g. a handle for a toothbrush, which overcomes at least one of the above-mentioned drawbacks. It is also an object of the present disclosure to provide a personal-care implement comprising such handle. It is also an object of the present disclosure to provide an oral-care implement which does not tip over when loaded with toothpaste and placed on a substantially planar surface. Further, the oral-care implement shall provide more comfort and improved quality perception as well as better maneuverability in the oral cavity during brushing.

SUMMARY OF THE INVENTION

In accordance with one aspect, a handle for a personal-care implement is provided, the handle having a longitudinal extension extending between a distal end and a proximal end, the proximal end being opposite the distal end and closest to a head permanently or releasably attached to the handle, the handle further having an outer lateral surface with a three-dimensional surface structure, wherein the surface structure comprises at least two continuous wave bands with alternating convex and concave curvatures forming wave crests and wave troughs, respectively, the wave bands extending along the longitudinal extension of the handle.

In accordance with one aspect a personal-care implement is provided, the personal-care implement comprising such handle and a head.

BRIEF DESCRIPTION OF THE DRAWINGS

The invention is described in more detail below with reference to various embodiments and figures, wherein.

DETAILED DESCRIPTION OF THE INVENTION

Figure 1:
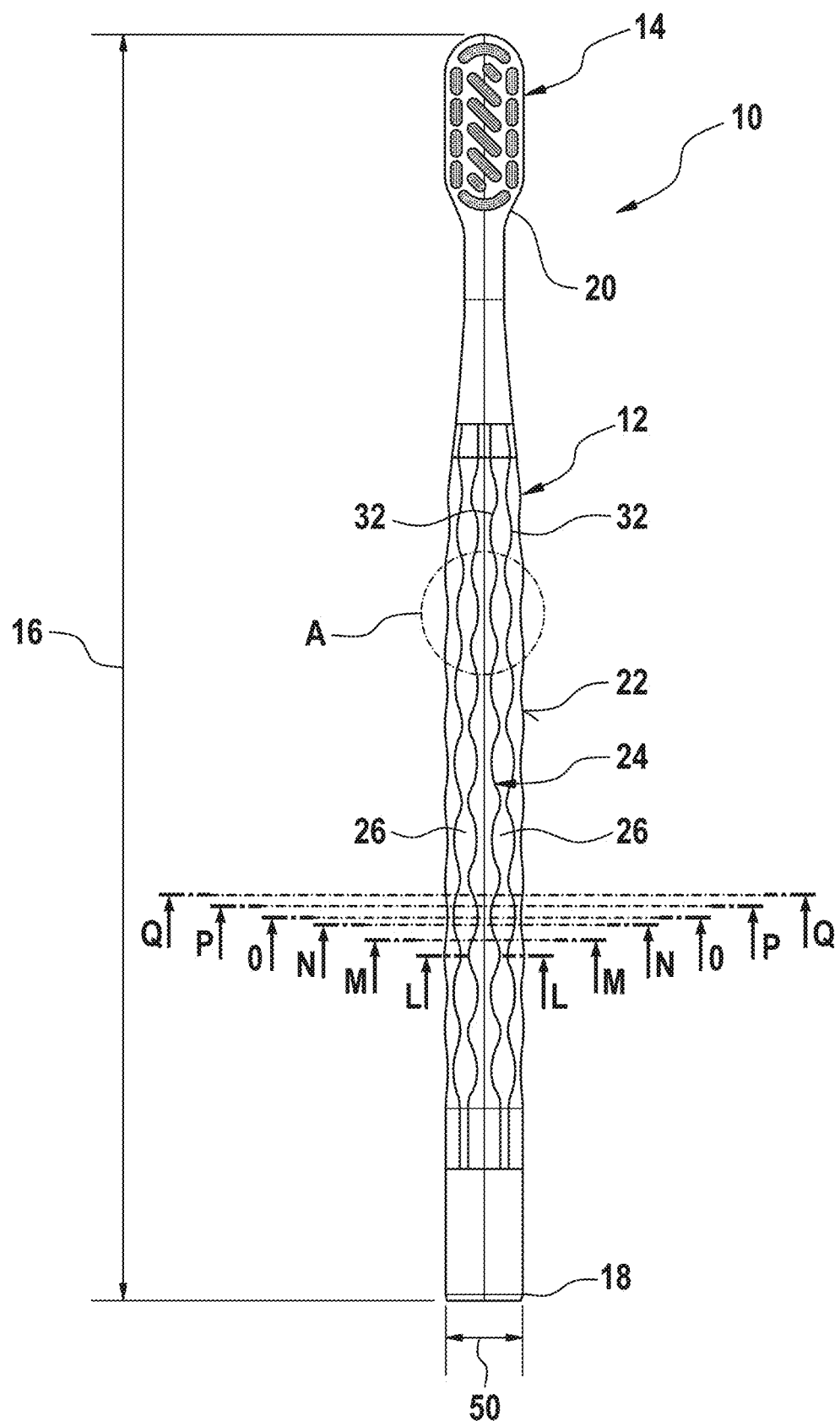
FIG. 1 shows a top view of an example embodiment of an oral-care implement comprising a handle according to the present disclosure.

The handle according to the present disclosure is suitable to be used in connection with a personal-care implement, for example in connection with an oral-care implement which may be a manual or powered toothbrush.

As used herein "personal-care implement" refers to any implement which can be utilized for the purposes of personal hygiene. Some suitable examples include toothbrushes, flossers, toothpicks, razors, shavers, and trimmers. For example, the personal-care implement may be manually or battery/electrically operated. If the implement is electrically operated, the implement may comprise a battery located within an inner cavity of a handle housing. For example, electrically operated toothbrushes exhibit the advantage that they assist users during brushing and may facilitate improved cleansing of the teeth and gums, in particular in hard to reach areas in the mouth.

The handle according to the present disclosure has a longitudinal extension extending between a distal end and a proximal end, the proximal end being opposite the distal end and defined as being the end closest to a head. The head may be permanently attached to the handle. Alternatively, the head can be repeatedly attachable to and detachable from the handle, e.g. via a snap-fit locking mechanism providing sufficiently strong connection and stability between the head and the handle to enable a user to perform, e.g. a brushing action. If the head is releasably attachable, the handle of the personal-care implement may be adapted for use over a longer period of time as compared to common implements, like common toothbrushes which are discarded after about three months of use. The head/brush refill can be exchanged on a regular basis. This provides a cost-efficient and environmentally sustainable personal-care implement providing both, high quality handle solutions as well as cost saving opportunities as only the head has to be exchanged/re-purchased after a certain period of use.

The handle has an outer lateral surface with a three-dimensional surface structure extending along the longitudinal extension of the handle. The surface structure comprises at least two continuous wave bands with alternating convex and concave curvatures forming wave crests and wave troughs, respectively. In other words, the alternating wave crests and wave troughs form depressions/indentations and elevations, respectively, the depressions and elevations extending in a radial direction from the center of the handle (the radial direction being substantially perpendicular to the longitudinal extension/direction of the handle).

The wave bands extend along the longitudinal extension of the handle, for example over a length from about 90 mm to about 140 mm, or from about 100 mm to about 130 mm, or from about 110 mm to about 120 mm. The three-dimensional surface structure may feature 10 to 14 wave bands, or 12 wave bands, for example, the wave bands being circumferentially arranged next to each other. Such structure may provide enhanced grip properties. The surface structure may also extend over the overall circumference of the handle to provide superior and comfortable handling properties. In other words, a multiplicity of wave bands may be circumferentially arranged next to each other. If a user holds the handle in its hand, various grip styles and rotational handle positions are possible, all grip styles benefitting from the same overall pleasant feel and improved handling properties during use.

The wave bands may be separated from each other by a bridge/edge extending along the longitudinal extension of the handle. Two neighboring bridges/edges may define the width extension of a band.

The alternating convex and concave curvatures extending along the length extension of the handle in connection with the bridges/edges also provide the handle with improved anti-slip properties during use, in particular if the implement is used in wet conditions. Handling properties, maneuverability and rotatability during use are significantly improved. If the personal-care implement is an oral-care implement, water, paste and slurry can easily drain off during and after use as each wave band can be provided with no edges along its longitudinal extension.

A maximum width extension may range from about 3 mm to about 6 mm, or from about 4 mm to about 5 mm, or may be about 4.4 mm, while a minimum width extension may range from about 1 mm to about 3 mm, or may be about 1.5 mm. The one or more edges may extend along the length extension of the handle in a substantially sinusoidal manner when seen in a top down view onto the outer lateral surface of the handle. In other words, the continuous wave bands may be positioned in a way that the maximum width of one wave band is adjacent the minimum width of the neighboring wave band. If at least two bridges/edges are arranged in a sinusoidal and anticyclic manner in relation to each other, such surface structure provides further anti-slip properties through its unique surface pattern/structure. Also, the surface structure prevents unintentional rolling/tumbling when the brush is placed on a surface, e.g. with toothpaste on the brush head. If the width of a wave band is about one third of the handle's diameter, such structure provides superior roll stop properties. For example, the width of the wave band may be about 4 mm at a handle diameter of about 11.5 mm.

The wave crest and/or the wave trough may have a height from about 0.1 mm to about 2 mm, or about 0.15 mm. A wave crest and a neighboring wave trough—forming one wave section—may have a length from about 8 mm to about 15 mm, or from about 11 mm to about 12 mm, or about 11.5 mm. Such structure may provide superior rinsability as slurry and paste can hardly accumulate in indentations formed by the smoothly alternating convex and concave curvatures. Further, such wave bands provide the right space to securely place the thumb tip/finger tips or other parts of the fingers into the indentations formed by the wave troughs. The wave bands may act as an integrated thumb rest during use of the personal-care implement. The handle is provided with improved handling properties, e.g. with anti-slip properties to improve maneuverability of the personal-care implement under wet conditions, e.g. when the user brushes his teeth. There is no need for the provision of a separate/additional thumb rest, e.g. being made from a thermoplastic elastomer material and/or from a polypropylene. This surface geometry helps rotating the handle in the hand, while providing a save position for the fingers as the alternating concave and convex curvatures work as a grip structure avoiding slipping of the implement.

The wave bands may be arranged in a manner, so that wave crests and wave troughs alternate along the circumference of the handle. In other words, a wave band is shifted to the next neighboring band by half of a wave section. Such surface structure provides a uniform pattern. A user can grip the handle in any manner and orientation if wave bands are provided over the overall circumference of the handle. The indentations provided by wave troughs serve as thumb rests while the bridges separating each wave band from the other band may serve as a roll stop.

The handle may have a substantially cylindrical shape allowing for universal handling and easy rotatability of the handle in the hand during use.

The handle may have a substantially flat bottom surface at the distal end of the handle (with mold draft of 0°), the bottom surface extending substantially perpendicular to the longitudinal extension of the handle. Such configuration allows the handle to be placed onto its bottom surface in an upright position. For example, after use of an oral-care implement, the user usually stores the wet implement in a toothbrush beaker for drying. However, in a classical toothbrush beaker, drained fluids get collected and accumulated at the bottom of the beaker, and, the fluids stay in contact with the implement for a longer period of time. Since the beaker is open on one side only, the toothbrush dries relatively slowly. Bacteria living in wet conditions/in a wet environment can grow quickly, contaminate the implement and finally render the implement unhygienic. However, a handle which can be placed on its bottom surface provides a solution for hygienic storage and drying, thereby enabling remaining water, toothpaste slurry and saliva to drain off. The implement can dry quickly thereby inhibiting bacterial growth and rendering the oral-care implement more hygienic. The implement according to the present disclosure is exposed to wet conditions over a significantly shorter period of time.

The bottom surface may have a substantially circular shape with a certain diameter. The dimeter may be from about 9 mm to about 14 mm, or about 11.5 mm allowing for an appealing design, improved maneuverability and comfortable haptic, and good stability if the implement is placed in an upright position.

A surface structure according to the present disclosure can be provided by conventional manufacturing techniques, like injection molding. For example, the handle including the surface structure may be made from PET (Polyethylene terephthalate), PP (polypropylene) and/or SAN (styrene acrylonitrile resin), e.g. my injection molding. The PET material may be transparent, translucent and/or opaque. The PP material may be translucent and/or opaque. The SAN material may be transparent, translucent and/or opaque.

The handle and/or the surface structure may be provided with a high-gloss surface finish and/or may be polish-eroded to allow for easy rinse off of water, paste and other residues to keep the implement clean and hygienic. Further, a combination of a surface structure with varying surface angles according to the present disclosure with a high-gloss surface finish enhances light reflections providing improved product appeal.

If the personal-care implement is a toothbrush, tooth cleaning elements, e.g. bundle of filaments forming one or a plurality of tufts, may be attached to the head by means of a hot tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so-called "sealplate"—around the ends of the filaments extending into the mold cavity by an injection molding process before the remaining part of the oral-care implement is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral-care implement. In other words, the tufts attached to the head by means of a hot tufting process are not doubled over a middle portion along their length and are not mounted in the head by using an anchor/staple. The tufts are mounted on the head by means of an anchor-free tufting process.

Alternatively, the head for the oral-care implement may be provided with a bristle carrier having at least one tuft hole, e.g. a blind-end bore. A tuft comprising a plurality of filaments may be fixed/anchored in said tuft hole by a stapling process/anchor tufting method. This means, that the filaments of the tuft are bent/folded around an anchor, e.g. an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner. Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral-care implements which are manufactured by a stapling process can be provided in a relatively low-cost and time-efficient manner.

The following is a non-limiting discussion of an example embodiment of an oral-care implement and parts thereof in accordance with the present disclosure, where reference to the Figures is made.

Figure 2:
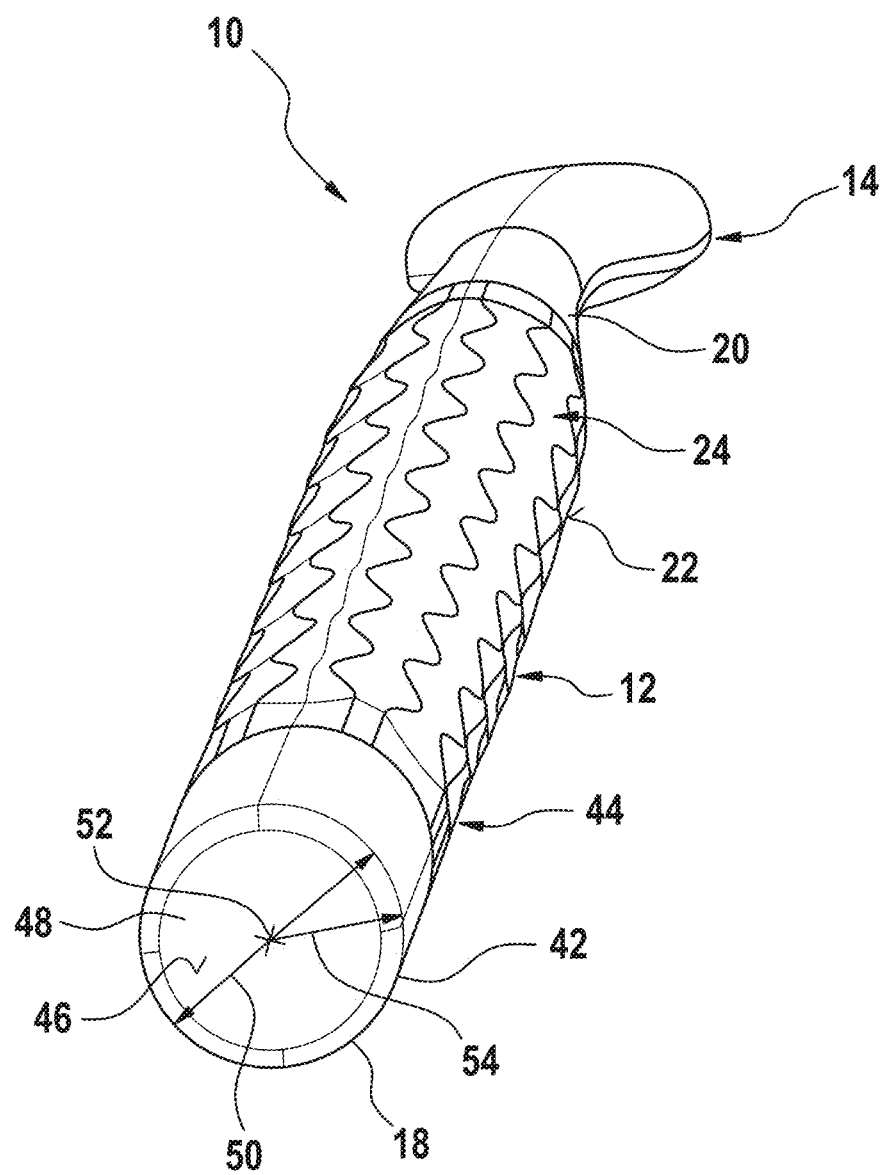
FIG. 2 shows a schematic perspective view of the oral-care implement of FIG. 1.

FIGS. 1 and 2 show a top down and perspective view of a personal-care implement 10, respectively, in this specific embodiment a manual oral-care implement, i.e. toothbrush 10. Toothbrush 10 comprises a handle 12 and a head 14 being integrally formed with the handle 12.

The handle 12 of toothbrush 10 has a longitudinal extension 16 extending between a distal end 18 and a proximal end 20. The proximal end 20 is opposite the distal end 18 and closest to the head 14 permanently attached to the handle 12.

Figure 4:
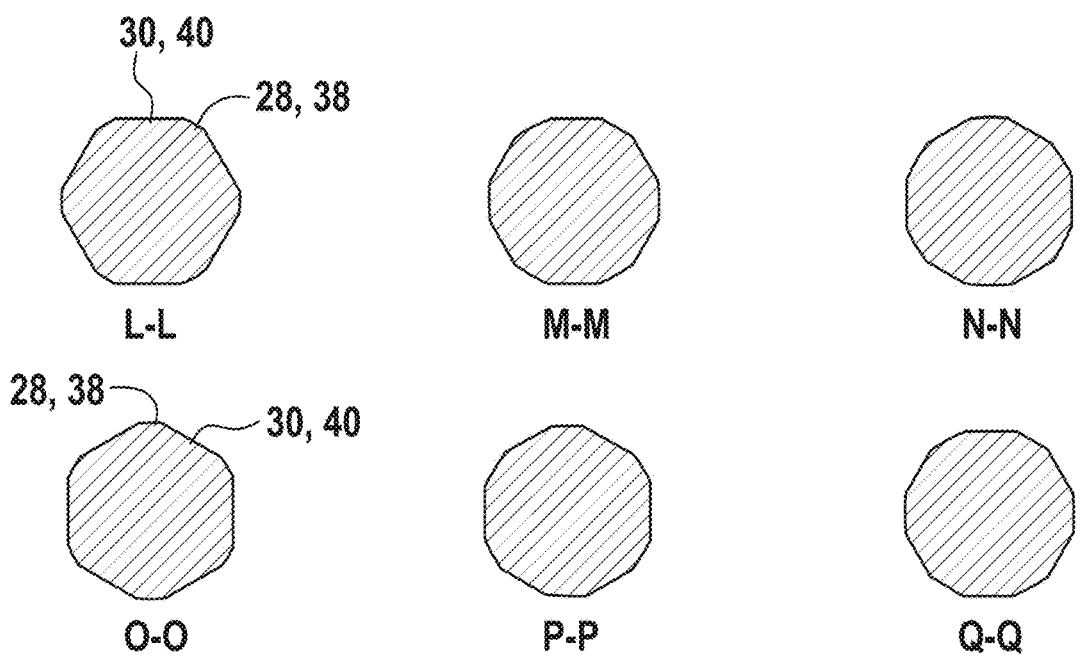
FIG. 4 shows cross-sectional views L-L, M-M, N-N, O-O, P-P, and Q-Q taken across the longitudinal extension of the handle of the oral-care implement of FIG. 1.

The handle 12 has an outer lateral surface 22 with a three-dimensional surface structure 24. The surface structure 24 comprises at least two continuous wave bands 26 with alternating convex and concave curvatures forming wave crests 28 and wave troughs 30, respectively. The wave bands 26 extend along the longitudinal extension 16 of the handle 12. The surface structure 24 may comprise from 10 to 14, preferably 12 continuous wave bands 26. The alternating convex and concave curvatures forming wave crests 28 and wave troughs 30, respectively, are illustrated in cross sectional views L-L to Q-Q of FIG. 4 in connection with FIG. 1.

Figure 3:
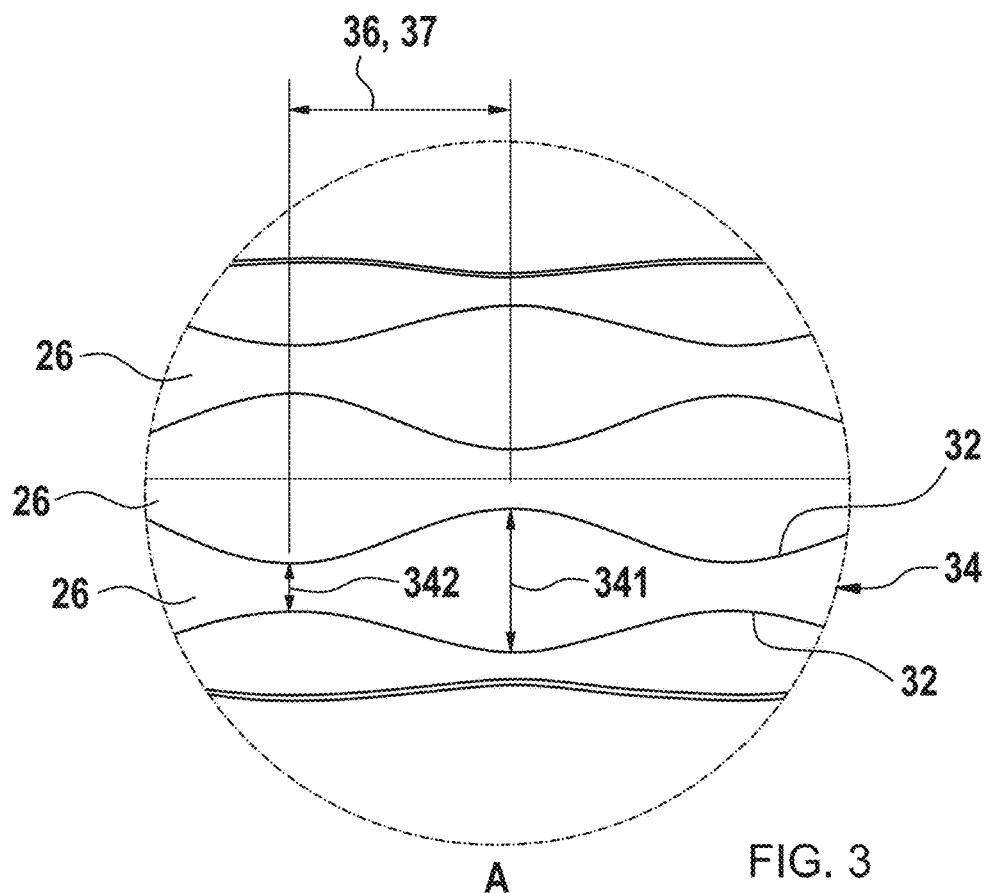
FIG. 3 shows an elevated view of a wave section of the handle of the oral-care implement of FIG. 1.

One wave crest 28 and one neighboring wave trough 30 form one wave section 36 (see FIG. 3). Each wave section 36 may have a length from about 8 mm to about 15 mm, or from about 11 mm to about 12 mm, or about 11.5 mm. The alternating wave crests 28 and wave troughs 30 form depressions/indentations and elevations, respectively. The wave crests 28 extend from the center 52 of the handle in a radial direction 54 to provide enhanced grip properties. While wave crests 28 may provide anti-slip properties, the wave troughs 30 may serve as indentations for placing and resting the fingers/thumb.

The wave crest 28 may have a height 38 from about 0.1 mm to about 2 mm, or from about 0.15 mm to about 1.5 mm, or from about 0.5 mm to about 1 mm, or about 0.15 mm. The wave trough 30 may have a height 40 from about 0.1 mm to about 2 mm, or from about 0.15 mm to about 1.5 mm, or from about 0.5 mm to about 1 mm, or about 0.15 mm.

The wave bands 26 are separated from each other by an edge/bridge 32 extending along the longitudinal extension 16 of the handle 12. Two neighboring edges 32 defining the width extension 34 of a band 26 (see FIG. 3). The maximum width extension 341 may be from about 3 mm to about 6 mm, or from about 4 mm to about 5 mm, or about 4.4 mm. The minimum width extension 342 may be from about 1 mm to about 3 mm, or about 1.5 mm.

As illustrated in FIGS. 1 and 3, the edges 32 extend along the length extension 16 of the handle 12 in a substantially sinusoidal manner when seen in a top down view onto the outer lateral surface 22 of the handle 12. The edges 32 are arranged in a sinusoidal and anticyclic manner in relation to each other so that a maximum width 341 of one wave band 26 is adjacent to the minimum width 342 of the neighboring wave band 26. In other words, a wave band 26 is shifted to its next neighboring one by half of a wave section 36. Consequently, wave crests 28 and wave troughs 30 alternate along a circumference 42 of the handle 12 and provide a uniform pattern/surface structure 24. Through the alternating structure improved anti-slip properties are provided. The wave bands 26 may act as integrated thumb rests during use of the toothbrush 10. The toothbrush 10 can be held and rotated in any position while still providing the same grip benefits. Also, the surface structure 24 prevents unintentional rolling/tumbling when the brush 10 is placed on a surface, e.g. with toothpaste on the brush head 14. If the width 34 of a wave band 26 is about one third of the handle's diameter 50, such structure provides superior roll stop properties. For example, the width 34 of the wave band 26 may be about 4 mm at a handle diameter 50 of about 11.5 mm.

The handle 12 has a substantially cylindrical shape 44 with a substantially flat bottom surface 46 at the distal end 18 of the handle 12. The bottom surface 46 extends substantially perpendicular to the longitudinal extension 16 of the handle 12. The bottom surface 46 has a substantially circular shape 48. The diameter 50 of the circular bottom surface 46 may be from about 9 mm to about 14 mm, or about 11.5 mm. The handle 12 can be easily placed onto the bottom surface 46 in an upright position for hygienic storage and drying, thereby enabling remaining water, toothpaste slurry and saliva to drain off. The toothbrush 10 can dry quickly thereby inhibiting bacterial growth and rendering the brush more hygienic. The toothbrush 10 is exposed to wet conditions over a significantly shorter period of time.

The toothbrush 10 maybe manufactured by injection molding. For example, the handle 12 including the surface structure 24 may be made from any of the following materials: PET (Polyethylene terephthalate), PP (polypropylene) and/or SAN (styrene acrylonitrile resin). The material may be transparent, translucent and/or opaque, with or without metallic effects.

Further, the handle 12 may be provided with a high-gloss surface finish and/or may be polish-eroded to allow for easy rinse off of water, paste and other residues to keep the implement clean and hygienic. A surface structure 24 with varying surface angles provided by the alternating wave crests and wave troughs according to the present disclosure together with a high-gloss surface finish enhances light reflections providing improved product appeal.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited.

The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A handle (12) suitable to be used in connection with a personal-care implement (10), the handle (12) having a longitudinal extension (16) extending between a distal end (18) and a proximal end (20), the proximal end (20) being opposite the distal end (18) and closest to a head (14) permanently or releasably attached to the handle (12), the handle (12) further having an outer lateral surface (22) with a three-dimensional surface structure (24), wherein
   the surface structure (24) comprises at least two continuous wave bands (26) extending along the longitudinal extension (16) of the handle (12), each continuous wave band (26) having alternating convex and concave curvatures forming wave crests (28) and wave troughs (30), respectively, along the longitudinal extension (16) of the handle (12),
   wherein the wave crests (28) and the wave troughs (30) form elevations and depressions, respectively, the elevations and depressions extending in a radial direction from a center of the handle (12), the radial direction being substantially perpendicular to the longitudinal extension (16) of the handle (12),
   wherein the wave bands (26) are separated from each other by respective edges (32) extending along the longitudinal extension (16) of the handle (12) in a substantially sinusoidal and anticyclic manner when seen in a top down view onto the outer lateral surface (22) of the handle (12),
   wherein two neighboring edges (32) define a width extension (34) of a wave band (26) having a substantially flat surface in the circumferential direction, the width extension (34) having maximum width extensions (341) and minimum width extensions (342) extending along the longitudinal extension (16) of the handle (12), wherein the wave troughs extending in a radial direction from the center of the handle (12) correspond with the maximum width extensions (341) and the wave crests extending in a radial direction from the center of the handle (12) correspond with the minimum width extensions (342), and
   wherein the maximum width extensions (341) of the wave bands (26) extend a width that is at least one third of a diameter of the handle.

2. The handle (12) of claim 1, wherein the surface structure (24) comprises from 10 to 14 continuous wave bands (26).

3. The handle (12) of claim 2, wherein the surface structure (24) comprises 12 continuous wave bands (26).

4. The handle (12) of claim 1, wherein the width of the maximum width extensions (341) are from about 3 mm to about 6 mm.

5. The handle (12) of claim 4, wherein the maximum width extension (341) is from about 4 mm to about 5 mm.

6. The handle (12) of claim 5, wherein the maximum width extension (341) is about 4.4 mm.

7. The handle (12) of claim 1, wherein the width of the minimum width extensions (342) are from about 1 mm to about 3 mm.

8. The handle (12) of claim 1, wherein a wave crest (28) and a neighboring wave trough (30) along the longitudinal extension (16) of the handle (12) form a wave section (36) having a length (37) selected from a length of from about 8 mm to about 15 mm, a length from about 11 mm to about 12 mm, and a length of about 11.5 mm.

9. The handle (12) of claim 1, wherein the wave crest (28) has a height (38) selected from a height of from about 0.1 mm to about 2 mm, a height of from about 0.15 mm, wherein the wave trough (30) has a height (40) from about 0.1 mm to about 2 mm.

10. The handle (12) of claim 1, wherein the wave bands (26) are arranged in a manner, so that wave crests (28) and wave troughs (30) alternate along a circumference (42) of the handle (12).

11. The handle (12) of claim 1, wherein the handle (12) has a substantially cylindrical shape (44).

12. The handle (12) of claim 1, wherein the handle (12) has a substantially flat bottom surface (46) at the distal end (18) of the handle (12), the bottom surface (46) extending substantially perpendicular to the longitudinal extension (16) of the handle (12).

13. The handle (12) of claim 12, wherein the bottom surface (46) has a substantially circular shape (48) having a dimeter (50) of from about 9 mm to about 14 mm.

14. A personal-care implement (10) comprising the handle (12) according to claim 1, wherein the personal-care implement (10) is a toothbrush.

15. The personal-care implement (10) according to claim 14, wherein the personal-care implement (10) is a manual toothbrush.

16. The personal-care implement (10) according to claim 14, wherein the personal-care implement (10) is a powered toothbrush.

17. The personal-care implement (10) according to claim 14, wherein the personal-care implement (10) comprises the head (14) that can be repeatedly attachable to and detachable from the handle (10).

18. The handle (12) of claim 1, wherein the substantially flat surface of each wave band (26) exhibits no curvature in the circumferential direction.

19. The handle (12) of claim 1, wherein surface structure is provided with a high-gloss surface finish and/or is polish-eroded.

* * * * *